United States Patent [19]
Hayashi

[11] Patent Number: 5,313,040
[45] Date of Patent: May 17, 1994

[54] MULTI-UNIT WELDING APPARATUS

[75] Inventor: Kenji Hayashi, Kure, Japan

[73] Assignee: Mazda Motor Corporation, Hiroshima, Japan

[21] Appl. No.: 36,203

[22] Filed: Mar. 23, 1993

[30] Foreign Application Priority Data

Mar. 23, 1992 [JP] Japan .................................. 4-064998

[51] Int. Cl.$^5$ ........................ B23K 11/11; B23K 11/24
[52] U.S. Cl. ....................................... 219/87; 219/116
[58] Field of Search ................. 219/86.9, 87, 116, 86.8

[56] References Cited

U.S. PATENT DOCUMENTS

| | | | |
|---|---|---|---|
| 3,053,973 | 9/1962 | Simmie | 219/116 |
| 3,125,668 | 3/1964 | Eisenburger et al. | 219/87 |
| 3,424,888 | 1/1969 | Sommeregger et al. | 219/87 |
| 3,725,632 | 4/1973 | Ritter et al. | 219/116 |
| 3,735,089 | 5/1973 | Sciaky | 219/116 |
| 4,496,820 | 1/1985 | Ritter et al. | 219/87 |
| 4,940,874 | 7/1990 | Ritter et al. | 219/87 |
| 4,963,712 | 10/1990 | Etoh et al. | 219/86.9 |

FOREIGN PATENT DOCUMENTS 63-145582  9/1988  Japan .

Primary Examiner—Geoffrey S. Evans
Attorney, Agent, or Firm—Keck, Mahin & Cate

[57] ABSTRACT

A multi-unit welding apparatus has a row of electric welding units all of which are connected in parallel with a single welding transformer through an electric conductor assembly. The electric conduction assembly includes a single strip of electric conductor and a double-folded strip of electrode conductor which are connected at one end to positive and negative terminals of a secondary winding of the welding transformer and are arranged along and connected to the welding units of the welding unit row so that the combined length of conductor between secondary winding and each welding unit is the same for all welding units.

5 Claims, 6 Drawing Sheets

MULTI-UNIT WELDING APPARATUS

BACKGROUND OF THE INVENTION

1. Field of the Invention

This invention relates to a multi-unit electric welding apparatus, and, more particularly, to an electric welding apparatus having a plurality of electric welding units, arranged in a row, which are supplied with welding current from a power source through a single welding transformer.

2. Description of Related Art

For space saving and low manufacturing cost, a plurality of welders, or electric welding units, are connected in parallel to a single welding transformer by means of electric conductors, or welding cables. If a plurality of electric welding units are arranged in a straight line, the welding cable must be longer as the distance of the electric welding unit from the welding transformer is. Accordingly, the welding cables have different electric resistances from one another and, hence, supply different welding work currents to the electric welding units. This results in non-uniform welding quality of works.

SUMMARY OF THE INVENTION

It is therefore an object of the present invention to provide a multi-unit electric welding apparatus which can perform electric welding of works with uniform welding quality.

The foregoing object of the present invention is accomplished by providing a multi-unit electric welding apparatus having a row of electric welding units all of which are supplied with welding currents from a single welding transformer through electric conductor means. This electric conductor means comprises a single strip of electric conductor and a double-folded strip of electrode conductor. The single strip of electric conductor is connected at one end to, for example, a positive terminal of the secondary winding of the welding transformer and extends along the electric welding unit row. The double-folded strip of electrode conductor is connected at one end to another one of the positive and negative terminals of the secondary winding of the welding transformer and is arranged along the single strip of electric conductor. All the electric welding units are connected in parallel to the single strip of electrode conductor and the double-folded strip of electrode conductor so that a total electric conductive length of both the strips of electrode conductors between the welding transformer and each electric welding unit is the same, thereby equalizing electric resistances between the transformer and the respective electric welding units. The multi-unit electric welding apparatus may include different types of electric welding units if different types of works are collectively processed.

BRIEF DESCRIPTION OF THE DRAWINGS

The above and other objects and features of the present invention will be clearly understood from the following detailed description of preferred embodiments thereof when considered in conjunction with the accompanying drawings, in which the same reference numerals have been used to denote similar or the same elements throughout the drawings, and in which.

DETAILED DESCRIPTION OF THE PREFERRED EMBODIMENT

Figure 1:
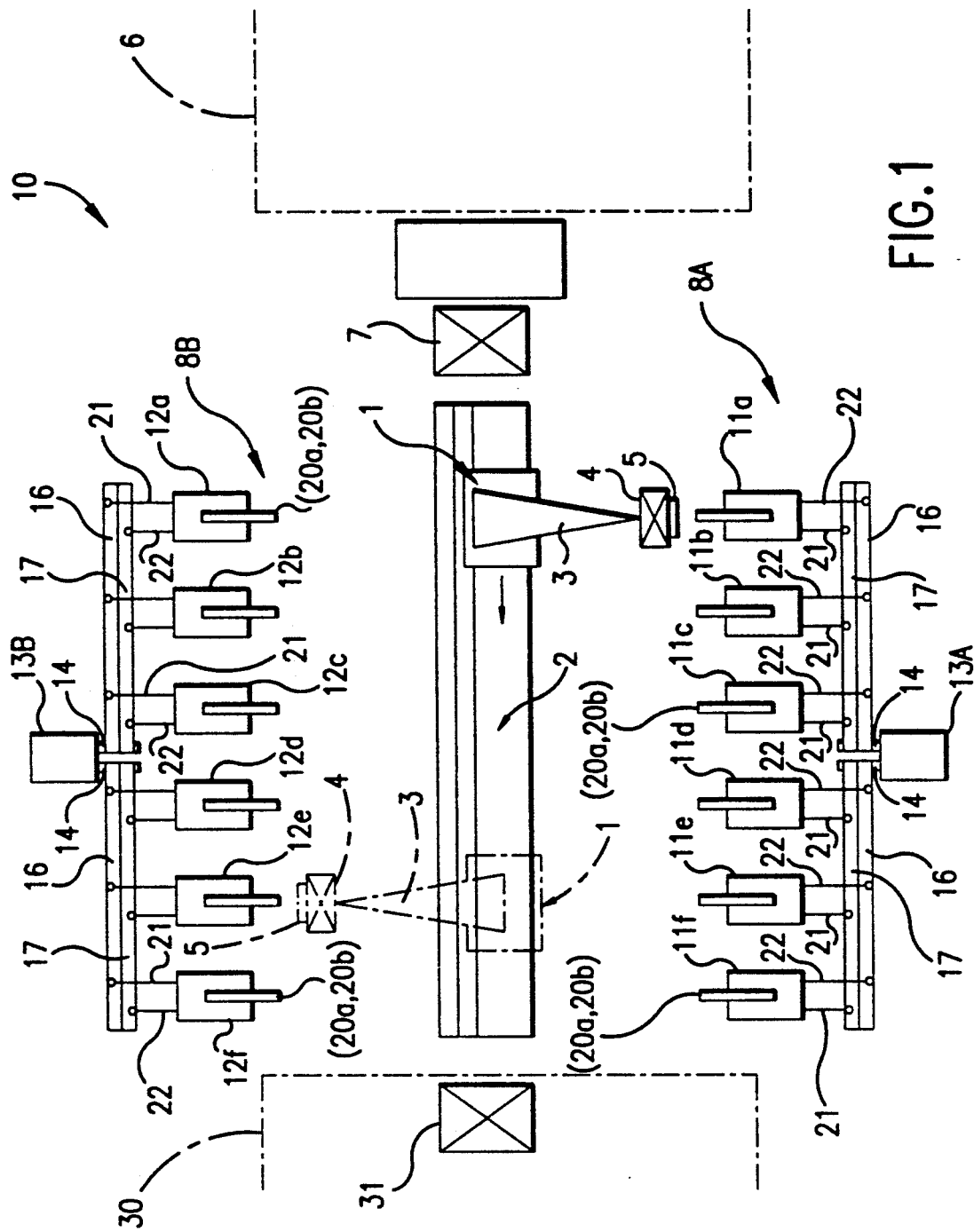
FIG. 1 is a schematic illustration showing a multi-unit electric welding apparatus in accordance with a preferred embodiment of the present invention.

Referring to the drawings in detail, and in particular, to FIG. 1, a multi-unit electric welding apparatus 10 in accordance with a preferred embodiment of the present invention is schematically shown, which is installed in, for instance, a welding station of a motor vehicle assembling line for secondary or intensifying welding of a hood reinforcement to a hood. The multi-unit electric welding apparatus 10 is arranged between a primary or preparatory welding station 6 and a pallet unloading station 30 located, respectively, upstream and downstream from it. This multi-unit electric welding apparatus 10 has two rows of electric welding units 8A and 8B which are separated at a distance from each other and are arranged in parallel with each other on opposite sides of robot transporting rails 2 extending in parallel between the preparatory welding station 6 and the pallet transporting line 30. The electric welding unit row 8A has a plurality of, for instance first to sixth, electric spot welding units $11_a$ to $11_f$ secured to base frames 100 (see FIG. 3) on the ground and arranged at equal separations in a straight line. Similarly, the electric welding unit row 8B has a plurality of, for instance first to sixth, electric spot welding units $12_a$ to $12_f$ arranged at equal separations in a straight line. The electric spot welding units $11_a$ to $11_f$ and $12_a$ to $12_f$ of the respective rows 8A and 8B are connected to welding transformers 13A and 13B located in the middle positions of the rows 8A and 8B, respectively, by means of electric conductor assemblies 40 of positive and negative electric conductors 16 and 17. Various combinations of different types of electric spot welding may be formed by these electric spot welding units $11_a$ to $11_f$ and $12_a$ to $12_f$ for different types of works 5 collectively processed in the intensifying welding station 10.

Figure 2:
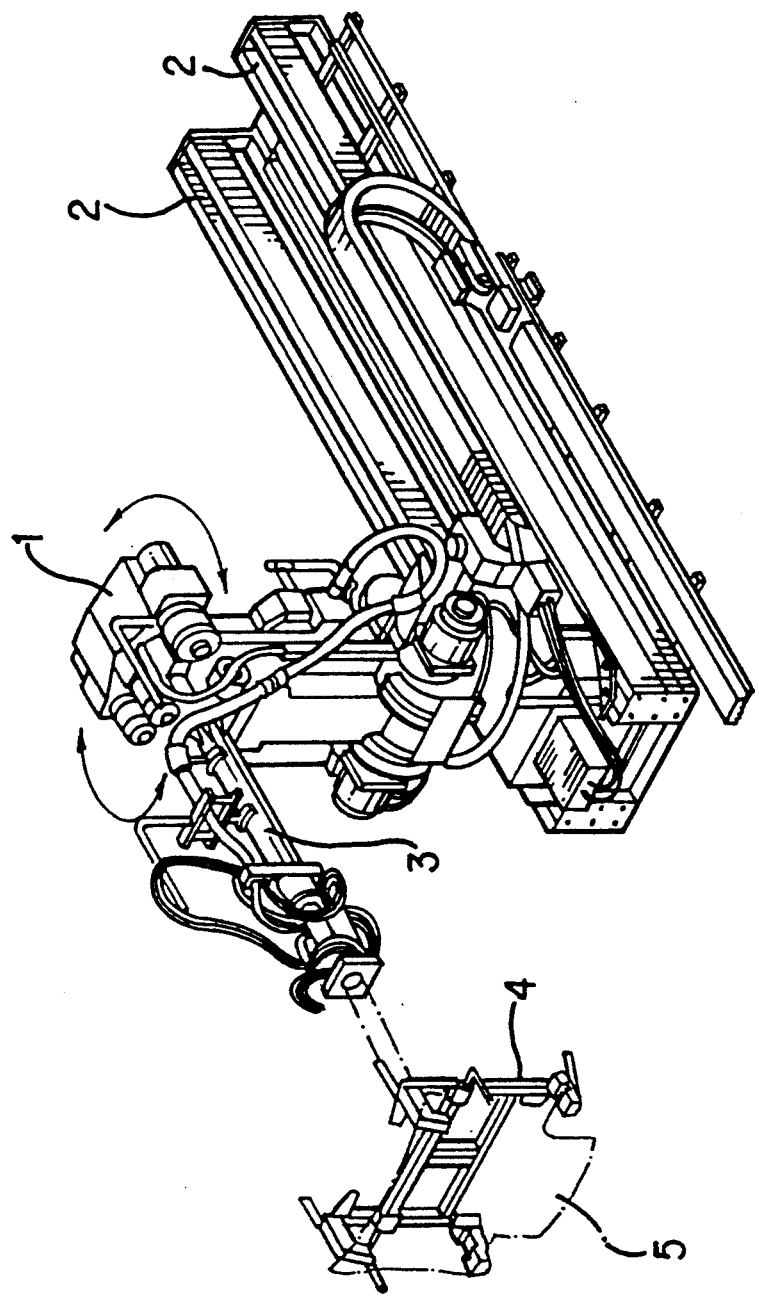
FIG. 2 is a perspective view of a work handling robot for use with the multi-unit electric welding apparatus.

Referring to FIG. 2, the multi-unit electric welding apparatus 10 includes the robot transporting rails 2, arranged between and in parallel with the parallel electric welding unit rows 8A and 8B, on which a work handling robot 1 slide back and fourth. The work handling robot 1, which is well known and may take any known form, has an arm 3 and hands 4 by which a work 5, such as a hood reinforcement panel, is grasped and handled. The work 5, i.e. a hood reinforcement panel, which has been welded to a hood panel at the preparatory welding station 6, is placed on and held by a holding jig pallet 7 located between the preparatory welding station 6 and the intensifying welding station 10 by means of a robot (not shown) or otherwise by any well known manipulator. When the work handling robot 1 grasps the holding jig pallet 7 holding the work 5 with its hands 4, it turns its arm 3 through approximately a right angle and then slides on the robot transporting rails 2 so as to locate the work 5 in front of one of the electric spot welding units $11_a$ to $11_f$ and $12_a$ to $12_f$ for spot welding. After the first spot welding, the work handling robot 1 slides again on the robot transporting rails 2 to another one of the electric spot welding units $11_a$ to $11_f$ and $12_a$ to $12_f$ for spot welding. In such a manner, the work handling robot 1 slides again on the robot transporting rails 2 to locate the work to another electric spot welding units. The work 5 is spot welded with the electric spot welding units $11_a$ to $11_f$ and $12_a$ to $12_f$ in a specified order. When accomplishing spot welding for specified spots of the work 5, the work handling robot 1 transfers the holding jig pallet 7 with the work 5 onto an unloading device 31 for unloading of the work 5 from the holding jig pallet 7.

The electric welding unit row 8A is provided in its middle position with a welding transformer 13A to which the electric spot welding units $11_a$ to $11_f$ are connected by means of the electric conductor assemblies 40 of positive and negative electric conductors 16 and 17 for welding current supply. Similarly, the electric welding unit row 8B is provided in its middle position with a welding transformer 13B to which the electric spot welding units $12_a$ to $12_f$ are connected by means of the electric conductor assemblies 40 of positive and negative electric conductors 16 and 17 for welding current supply.

Figure 3:
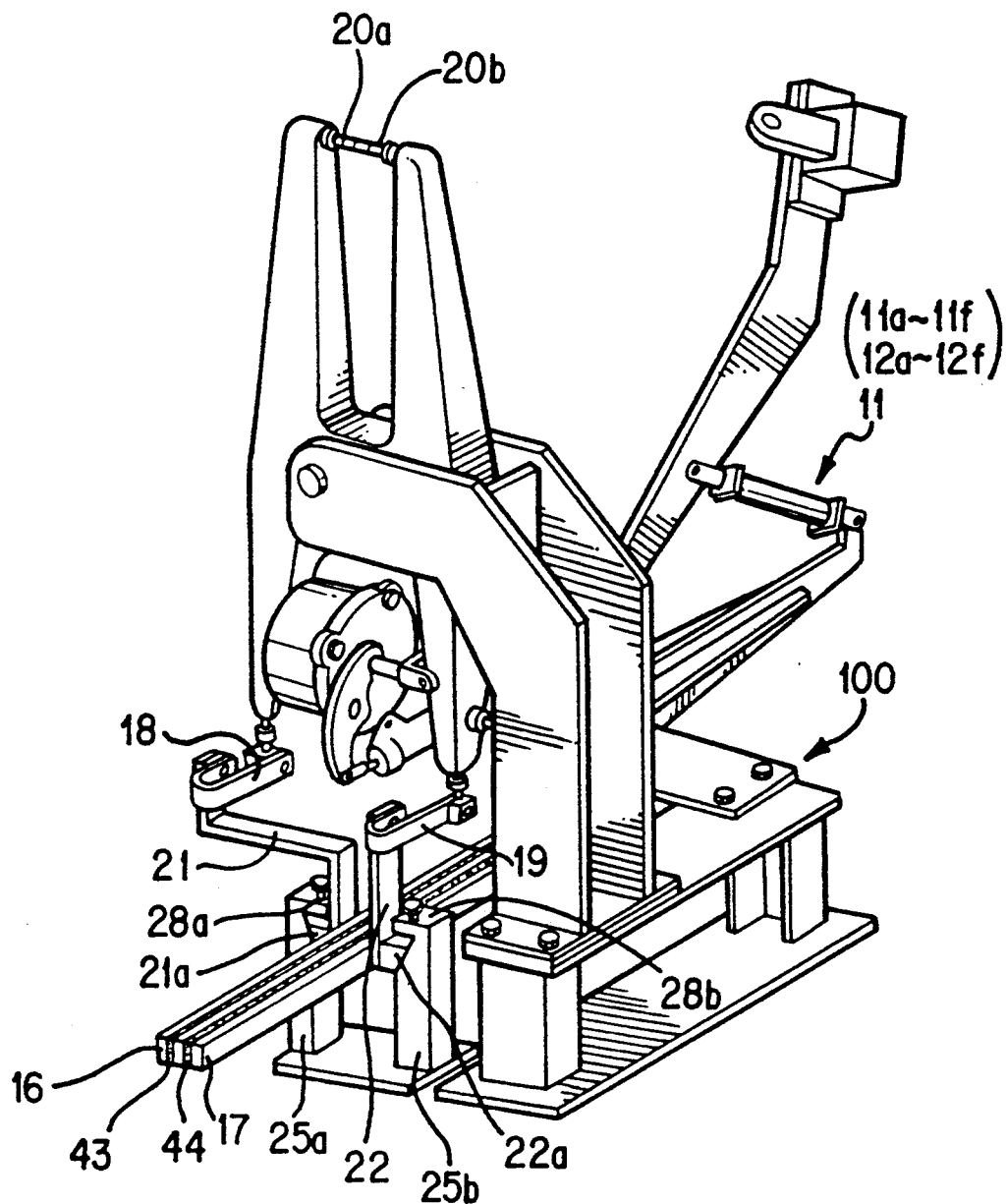
FIG. 3 is a perspective view of a spot welding unit of the multi-unit electric welding apparatus.
Figure 4:
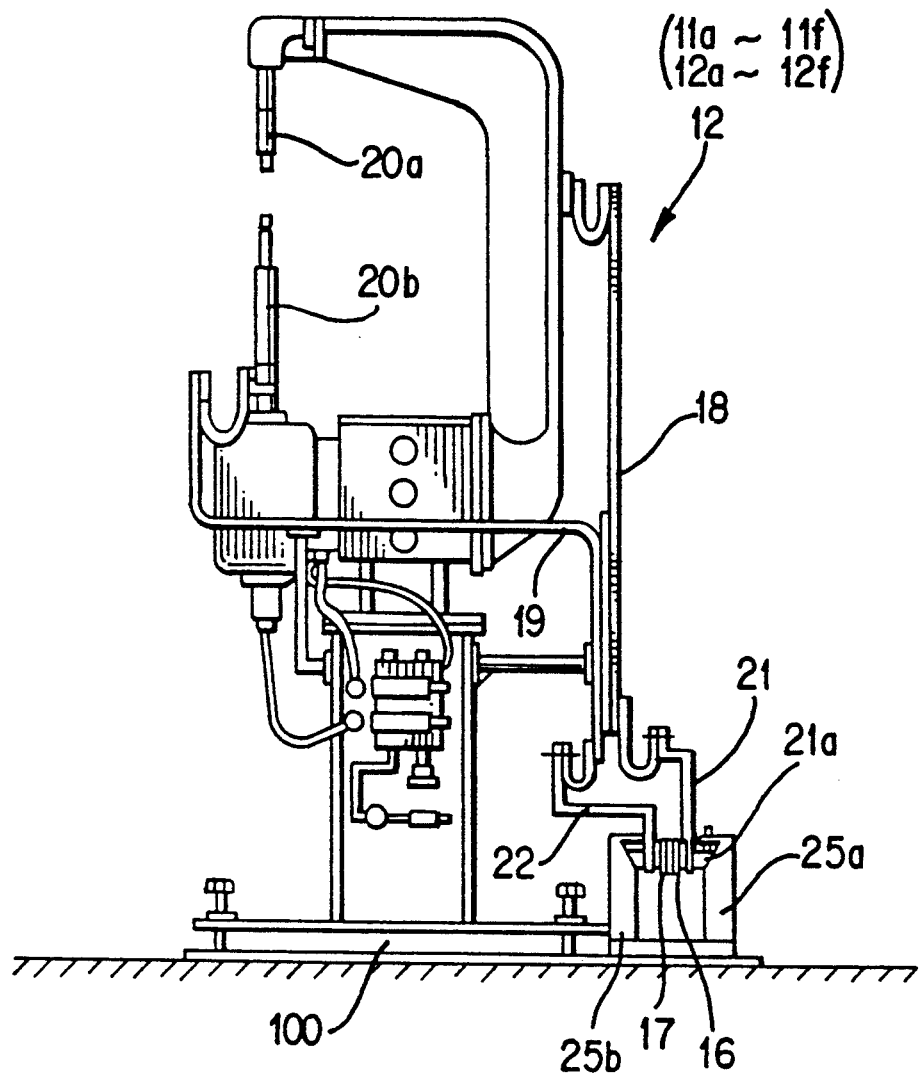
FIG. 4 is a side view of another spot welding unit of the multi-unit electric welding apparatus.

Referring to FIGS. 3 and 4 which show different types of electric spot welding units, both types of electric welding units 11 and 12 have spot electrodes $20a$ and $20b$ which are connected to connector terminals 21 and 22 through conductive flexible strips 18 and 19, respectively. The connector terminals 21 and 22 are attached to the positive and negative electric conductors 16 and 17, respectively. On the other hand, each of the welding transformers 13A and 13B has a pair of positive and negative terminals 14 and 15 of its secondary winding. The positive terminals 14 are connected by connectors 41 to positive electric conductors 16, which extend in opposite directions from each of the welding transformers 13A and 13B to opposite ends of each of the electric welding unit rows 8A and 8B. The negative terminals 15 are connected by connector 42 to negative electric conductors 17, which extend from each of the welding transformers 13A and 13B to the opposite ends of each of the electric welding unit rows 8A and 8B and are folded back near the negative terminals 15, and are placed side by and insulated from the positive strip conductors 16. To the electric conductors 16 and 17, the connector terminals 21 and 22 of the spot electrodes $20a$ and $20b$ of each of the electric welding units 11 and 12 are connected as will be described hereafter.

Figure 5:
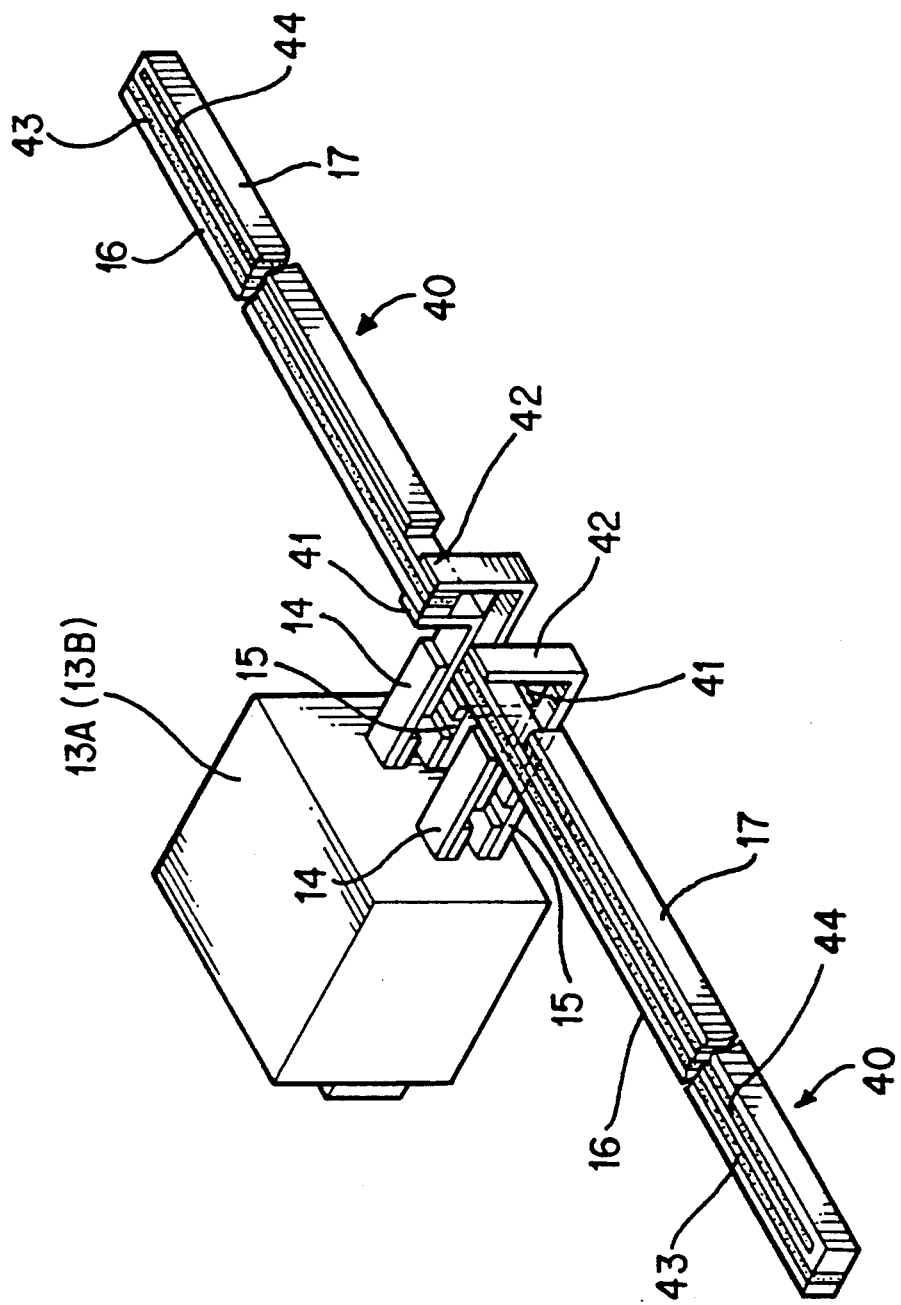
FIG. 5 is a perspective view of electric conductor assemblies of the multi-unit electric welding apparatus.

As shown in detail in FIG. 5, the positive electric conductor 16 of each electric conductor assembly 40, which is made of a straight strip, extends between the welding transformer and the extreme electric welding units 13A, 13B and the extreme electric welding units ($13A$-$11_a$, $13A$-$11_f$, $13B$-$12_a$, $13B$-$12_f$). The negative electric conductor 17, which is made of a generally U-shaped strip folded at an outer end, extends between the welding transformer 13A, 13B and the extreme electric welding unit ($13A$-$11_a$, $13A$-$11_f$, $13B$-$12_a$, $13B$-$12_f$). These positive and negative electric conductors 16 and 17 are arranged side by side with insulating strips 43 and 44 located therebetween. In this instance, the connector terminals 21 and 22 of each electric welding unit $11_a$-$11_e$, $12_a$-$12_f$ are, respectively, connected to the positive and negative terminals 14 and 15 of each welding transformer 13A, 13B in such a way that the total conductor length of the positive and negative electric conductors 16 and 17 between the positive and negative terminals 14 and 15 of each welding transformer 13A, 13B and the connector terminals 21 and 22 of each electric welding unit is equaled for all of the electric welding units $11_a$ to $11_e$ and $12_a$ and $12_f$. According to this electrical connection between the welding transformers 13A and 13B and the electric welding units $11_a$ to $11_e$ and $12_a$ and $12_f$, an equal electric resistance of the electrodes 16 and 17 is provided for all electric welding units $11_a$ to $11_e$ and $12_a$ and $12_f$.

As was previously described, various combinations of different types of spot welding may be formed by these electric welding units $11_a$ to $11_f$ and $12_a$ to $12_f$ for different types of works 5 collectively processed in the intensifying welding station 10. For this, some of the electric welding units $11_a$-$11_f$ and $12_a$-$12_f$ may be replaceable with other types of electric welding units. For easy replacement of each electric welding units $11_a$-$11_f$, $12_a$-$12_f$, the connector terminals 21 and 22 are structured to be detachably connected to the electric conductor assembly 40 as shown in detail in FIG. 6.

Figure 6:
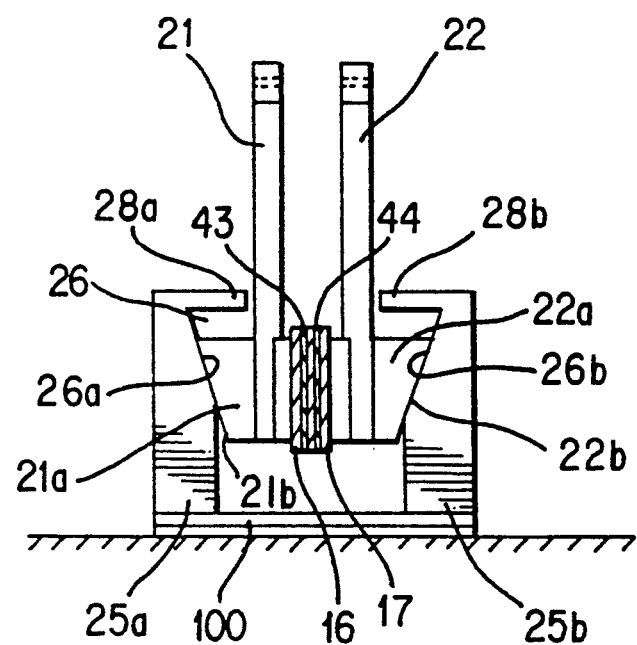
FIG. 6 is a side view of a connecting mechanism.

Referring to FIG. 6, a pair of posts $25a$ and $25b$ are secured onto the base frame 100 so as to form a space in which the electric conductor assembly 40 is located. These posts $25a$ and $25b$ are formed with inner tapered surfaces $26a$ and $26b$, respectively, which face to each other so as to define a trapezoidal channel 26 therebetween. On the other hand, the connector terminals 21 and 22 are fixedly provided with clips $21a$ and $22a$ at their lower ends, which are formed with outer tapered surfaces $21b$ and $22b$, respectively, so as to form a trapezoidal block which matches in shape with but is slightly smaller in size than the trapezoidal channel 26.

These clips $21a$ and $22a$ are inserted sideways, i.e. in the lengthwise direction of the electric conductor assembly 40, into spaces formed between the electric conductor assembly 40 and the respective inner tapered surface $26a$ and $26b$ along the electric conductor assembly 40 and, then, pushed down so as to firmly sandwich the electric conductor assembly 40 therebetween. In this manner, the connector terminals 21 and 22 are easily connected to the electric conductor assembly 40. If pulling up and out sideways the clips $21a$ and $22a$, the connector terminals 21 and 22 are easily disconnected from the electric conductor assembly 40. This structure of connector terminals 21 and 22 contributes to an easy replacement of the electric welding unit $11_a$-$11_e$, $12_a$-$12_f$. The clips $21a$ and $22a$ are prevented by upper flanges $28a$ and $28b$ formed at upper ends of the posts $25a$ and $25b$, respectively, from slipping out from the posts $25a$ and $25b$.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

I claim:

1. In a multi-unit electric welding apparatus having a row of electric welding units, all of which are supplied with welding current from positive and negative terminals of a secondary winding of a single welding transformer through electric conductor means for delivering welding current to the electric welding units, the improvement comprising: said electric conductor means being comprised of (a) a pair of single strip electric conductors, each of said single strip electric conductors being connected at one end to one of the positive and negative terminals of the secondary winding of said single welding transformer and arranged to extend along said electric welding unit row in opposite directions, and (b) a pair of double-folded strip electrode conductors, each of said double-folded strip electrode conductors being connected at one end to the other one of said positive and negative terminals of the secondary winding of said single welding transformer and arranged to extend beside said pair of single strip electric conductors in said opposite directions, said electric welding units being connected in parallel to said pair of single strip electrode conductors and said pair of double-folded strip electrode conductors so that a total electric conductive length of both of said strips of electrode conductors between said welding transformer and each of said electric welding units is the same for all electric welding units.

2. In a multi-unit electric welding apparatus as defined in claim 1, the further improvement of said row of electric welding units including electric welding units with spot electrodes in different orientations.

3. In a multi-unit electric welding apparatus as defined in claim 1, the further improvement of connector terminal means for detachably connecting each of said electric welding units to said electric conductor means.

4. In a multi-unit electric welding apparatus as defined in claim 3, the further improvement of said connector terminal means being connected to each of said electric welding units by flexible conductors.

5. In a multi-unit electric welding apparatus as defined in claim 1, the further improvement comprising a work handling robot located adjacent said row of electric welding units and being mounted for movement along said row of electric welding units.

* * * * *